(12) United States Patent
Naljotov (10) Patent No.: US 8,002,458 B2
(45) Date of Patent: Aug. 23, 2011

(54) RIDDLING MACHINE SYSTEM

(75) Inventor: Oleg Naljotov, Brooklyn, NY (US)

(73) Assignee: Al Saint, Brooklyn, NY (US)

( * ) Notice: Subject to any disclaimer, the term of this patent is extended or adjusted under 35 U.S.C. 154(b) by 345 days.

(21) Appl. No.: 12/349,594

(22) Filed: Jan. 7, 2009

(65) Prior Publication Data

US 2010/0170401 A1 Jul. 8, 2010

(51) Int. Cl.
*B01F 11/00* (2006.01)
(52) U.S. Cl. ...................... 366/217; 366/277.2
(58) Field of Classification Search .......... 366/208–220, 366/233; 99/275–277.2
See application file for complete search history.

(56) References Cited

U.S. PATENT DOCUMENTS

| | | | | |
|---|---|---|---|---|
| 2,056,014 A | * | 9/1936 | Moore et al. | 366/209 |
| 3,533,602 A | * | 10/1970 | Heck et al. | 366/109 |
| 3,682,088 A | * | 8/1972 | Paniez | 99/277.2 |
| 4,235,940 A | * | 11/1980 | Williams et al. | 426/592 |
| 4,324,172 A | * | 4/1982 | Cazals et al. | 99/277.1 |
| 4,356,208 A | * | 10/1982 | Williams et al. | 426/592 |
| 4,405,997 A | * | 9/1983 | Jordan et al. | 366/111 |
| 4,449,886 A | * | 5/1984 | Kalua | 414/776 |
| 4,524,680 A | * | 6/1985 | Jeanrat et al. | 99/277.1 |
| 4,596,469 A | * | 6/1986 | Huntsinger et al. | 366/111 |
| 4,841,848 A | * | 6/1989 | Baker et al. | 99/277.2 |
| 2004/0244597 A1 | * | 12/2004 | Naljotov et al. | 99/275 |
| 2007/0133348 A1 | * | 6/2007 | Naljotov | 366/213 |
| 2007/0291580 A1 | * | 12/2007 | Naljolov et al. | 366/110 |
| 2008/0251478 A1 | * | 10/2008 | Jaskowski | 211/74 |
| 2010/0170401 A1 | * | 7/2010 | Naljotov | 99/277.2 |

FOREIGN PATENT DOCUMENTS

FR 2609472 A1 * 7/1988

* cited by examiner

*Primary Examiner* — Charles E Cooley
(74) *Attorney, Agent, or Firm* — Office of Menachem Zev Levoritz; Menachem Zev Levoritz (57) ABSTRACT

A riddling machine for making champagne is proposed, with a base, main motor, main shaft driven by the motor, pivotal parallel frames each fixed to a first half-axle and a second hollow half-axle revolvably mounted, and an inner shaft enclosed into the second half-axle, bevel gears including a driving wheel coupled to the inner shaft, and a driven wheel rotatably mounted on the frame furnished with bottle holders and controllably rotatable within an ALPHA angle range and capable of revolving the holders, a first gear capable of conveying rotation from the main shaft to the inner shafts, an intermediate shaft controllably engaged/disengaged with the main shaft, and connected through a braking muff to an intermediate axle, and a second gear capable of providing a controllable tilt angle BETA of the frames driven via the intermediate axle, and conveying rotation to the first half-axles of frames.

5 Claims, 11 Drawing Sheets

RIDDLING MACHINE SYSTEM

TECHNICAL FIELD

The present invention relates to the food industry, particularly to the wine industry, and can be used for the riddling stage of sparkling wine production, particularly, champagne.

BACKGROUND OF THE INVENTION

The traditional technology of champagne making, particularly described on the web page "http://www.champagne-ayalalr/fabrication_eng.html#top" includes the following stages: pressing (the grapes are placed in special presses to yield their juice), winemaking (the first fermentation—transformation of sugar into alcohol), blending (blending wines from different vineyards and different harvests), bottling (the second fermentation—in the definite bottle), riddling or remuage (gathering the dead yeast cells or sediment, also known as lies or lees, which are formed during the bottling, and brought to the neck of the bottle during this stage), disgorgement (the bottle necks are frozen, trapping the sediments in a chunk of ice, the bottles are opened, and the sediments are expelled with the ice by the pressure in the bottle).

The riddling stage, intended to make the sediment deposit slide into the neck of the bottle, prescribes: "During 4 to 5 weeks the bottles are placed at a 45 degree angle, stored on racks and are handled, manually or automatically, about 40 times. They are regularly turned (an eighth or a fourth of a turn) and progressively brought back up to a vertical position. The mechanical riddling can achieve this in about a week, while the manual riddling takes about one month."

When Veuve Clicquot first developed the riddling system, every step was done by hand. The complete process took usually from six to eight weeks for a batch of about 5000 bottles. Some producers still use this hands-on method. After the second fermentation in the bottle, and after the aging period on the yeast sediment in the bottle, the bottles are taken from their resting place and inserted into large A-frame wooden racks, called pupitres, with the neck of the bottles pointing slightly downward. The sediment at this stage appears as a strip, with many dead yeast cells adhering to the side of the bottle. The riddler is to maneuver the sediment into a manageable lump inside the bottle, and then bring the lees down the bottle into the bottle neck, close to the crown cap closing the bottle.

In order to do this, the following steps are repeatedly performed on each bottle: the riddler manually grasps the bottom end of each bottle; shakes the bottle slightly to dislodge any stuck lees; turns the bottle approximately one-eighth of a turn; raises the bottom end of the bottle slightly; drops the bottle back into the hole in the rack. Such handling of the bottle gradually ousts the sediment into the neck of the bottle, at which point the bottle is almost completely inverted on the rack.

Many champagne sparkling wine producers use modern automated methods to riddle the wine. There are semi-automatic and automatic devices called "gyropalettes", where a hexagonal metal basket with an inverted cone-shaped base is filled with inverted bottles and occasionally rotated from side to side.

In 1966, Adolf Heck invented and patented the first automatic riddling machine. Korbel has continued to improve upon Adolf's idea, and today it is possible to produce champagne of consistent high quality with the gyropalettes. According to Korbel, the bottled wine is placed upside down in shipping cases that are arranged on automatic riddling racks. These racks gently vibrate the bottles for one hour, four times a day. During the vibration, the cases are gently rocked every two minutes which eventually works the lees down into the neck of the bottle.

Computer-automated gyropalettes accomplish the riddling in batches, using movable bins containing thousands of bottles. Invented in Spain, they became common in all sparkling wine producing countries since the late 1970s. The mechanization allows for saving time, space and production cost for the producers. Hand riddling requires a minimum of eight weeks to complete, whereas the gyropalettes finish the task in less than ten days. According to the article, this application of modern technology also increases product consistency from bottle to bottle. Production cost savings also has allowed the introduction of traditional method sparkling wines into the lower price end of the market where formerly only bulk produced wines competed. However, the gyropalettes are complicated machines, expensive to manufacture, which leads to an increase of the overall cost of champagne.

The present invention further improves the design of champagne making machines demonstrated in the U.S. patent application Ser. Nos. 10/453,074, 11/453,517, and 11/543,448, all entirely incorporated by reference, with the purpose of further increasing the efficiency and reduction of costs for machine manufacturing and wine production.

BRIEF SUMMARY OF THE PRESENT INVENTION

A riddling machine for intensification of a process of depositing dead yeast cells in the wine technology is provided, according to the present invention. The riddling machine includes at least one device comprising: a base, a main motor, a main shaft driven by the motor, a number of pivotal parallel frames each fixed to a first half-axle and a second hollow half-axle revolvably mounted on an inner shaft enclosed into the second half-axle, bevel gears including a driving wheel coupled to the inner shaft, and a driven wheel rotatably mounted on the frame furnished with bottle holders and controllably rotatable within an ALPHA angle range and with means revolving the holders driven by the driven wheel, a first gear means for conveying rotation from the main shaft to the inner shafts, an intermediate shaft controllably engaged/disengaged with the main shaft, and connected through a braking muff to an intermediate axle, and a second gear means for providing a controllable tilt angle BETA of the frames driven via the intermediate axle, and conveying rotation to the first half-axles of frames. The machine includes a control system controlling the process, and providing necessary conditions and parameters of the champagne making technology.

DESCRIPTION OF DRAWINGS OF THE PRESENT INVENTION

Each reference numeral indicated on FIGS. 1-8 is designated to an element of the inventive champagne riddling machine described herein below. A first time introduced reference numeral in the description is enclosed into parentheses.

DESCRIPTION OF PREFERRED EMBODIMENTS OF THE PRESENT INVENTION

While the invention may be susceptible to embodiment in different forms, there are shown in the drawings, and will be described in detail herein, specific embodiments of the present invention, with the understanding that the present disclosure is to be considered an exemplification of the principles of the invention, and is not intended to limit the invention to that as illustrated and described herein.

'Chain-Chain' Version

Figure 1:
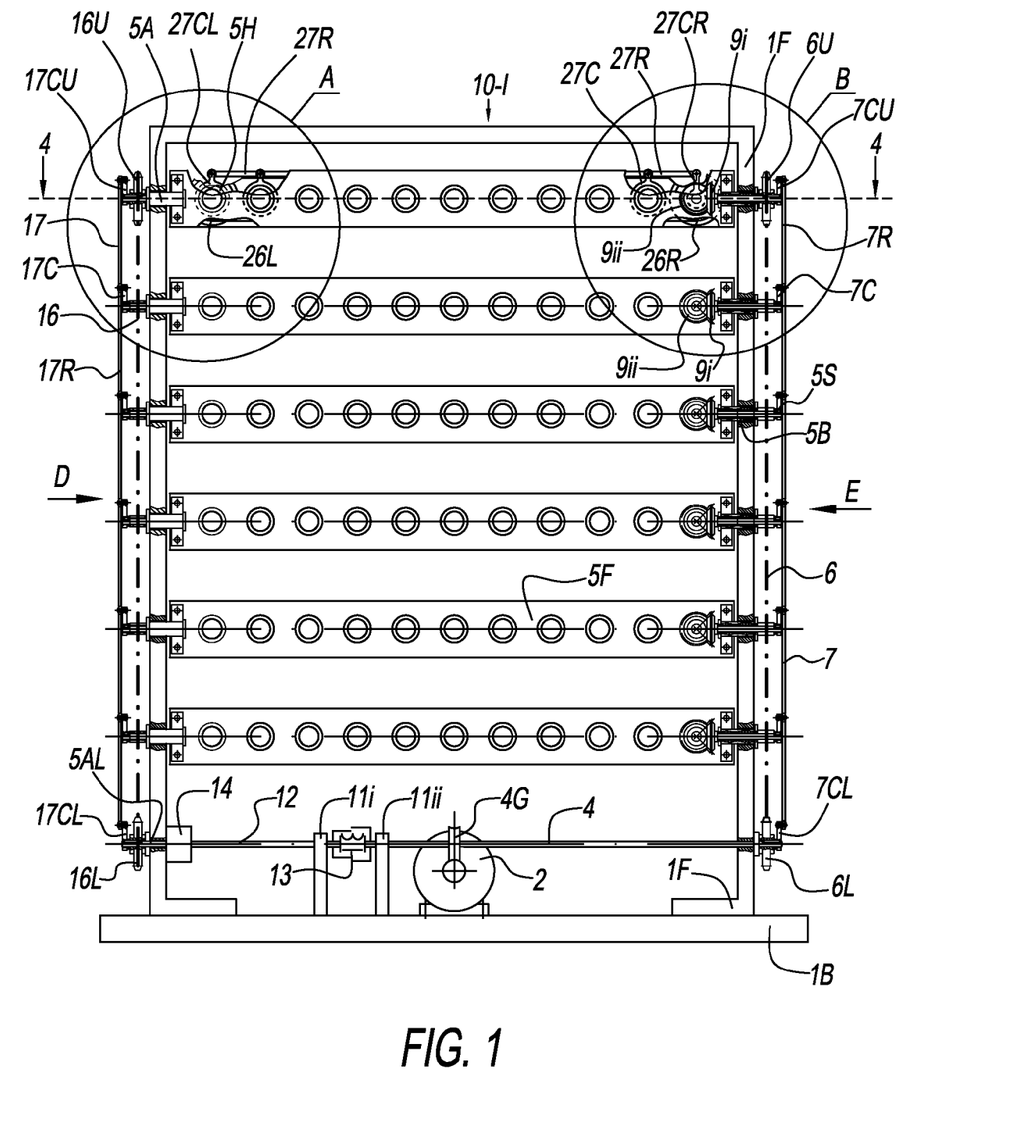
FIGS. 1, 1A, and 1B show a general front view and the left and right side views, respectively, of a main device (in the 'chain-chain' version) of the champagne riddling machine, according to a preferred embodiment of the present invention.
Figure 1A:
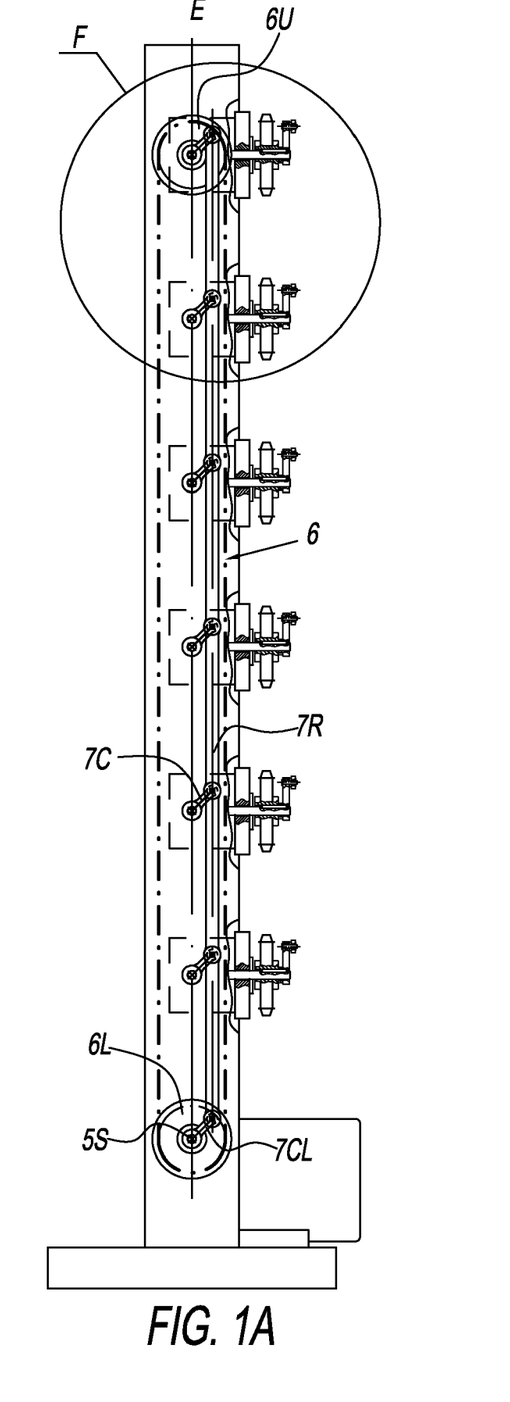
Figure 1B:
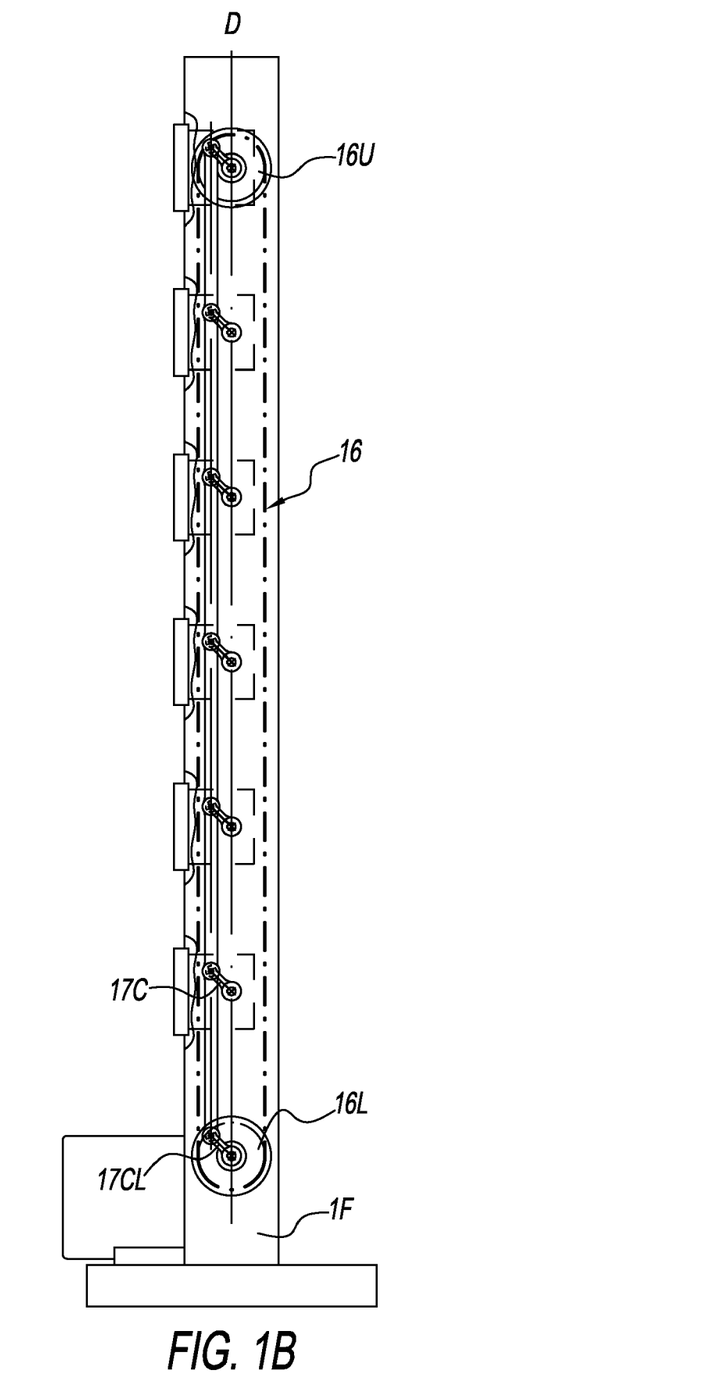
Figure 2A:
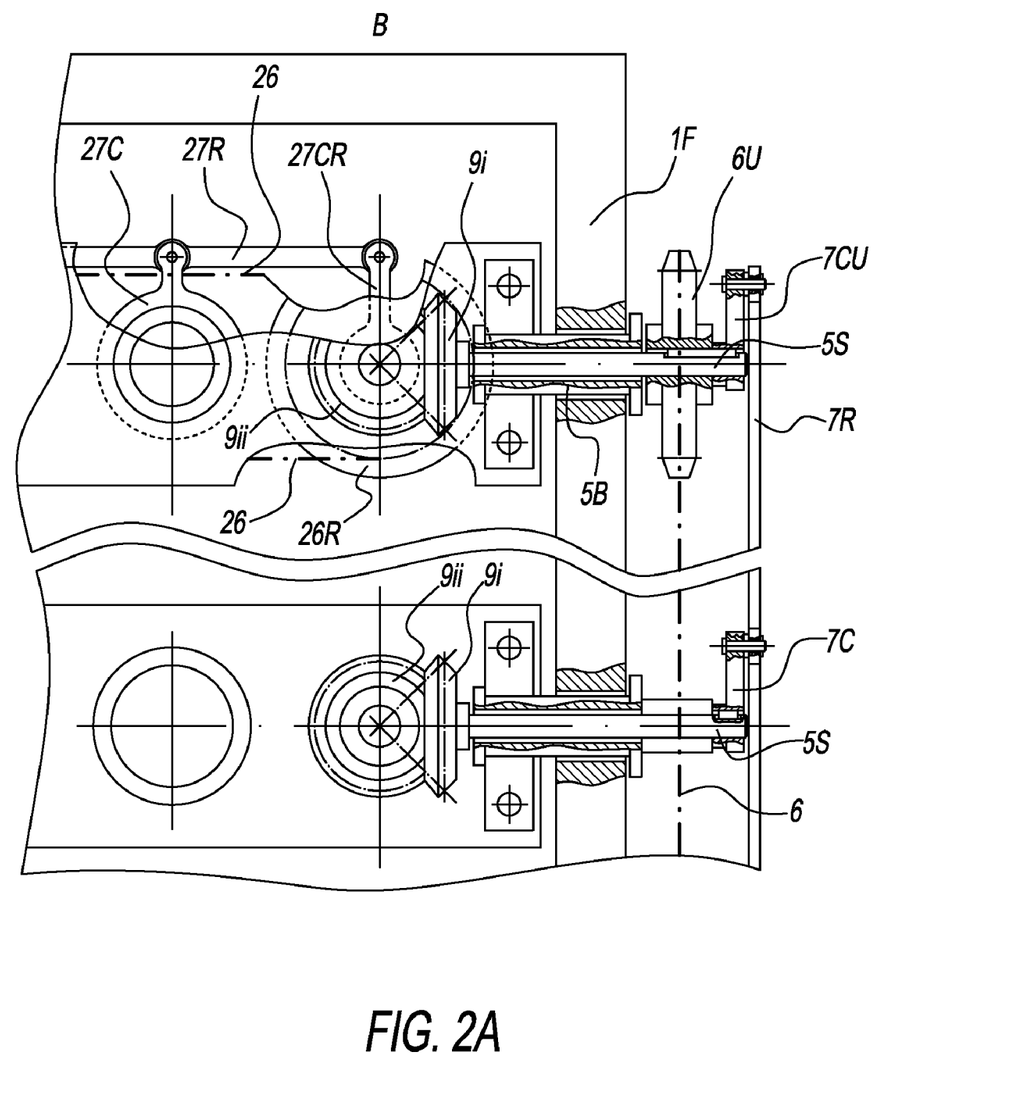
FIGS. 2a and 2b show fragmental sectional views of the main device, within the areas defined by circles A and B, respectively, (in the 'chain-chain' version) depicting a chain unit and a connecting rod unit for revolving bottle holders, according to the preferred embodiment of the present invention shown on FIG. 1.
Figure 2B:
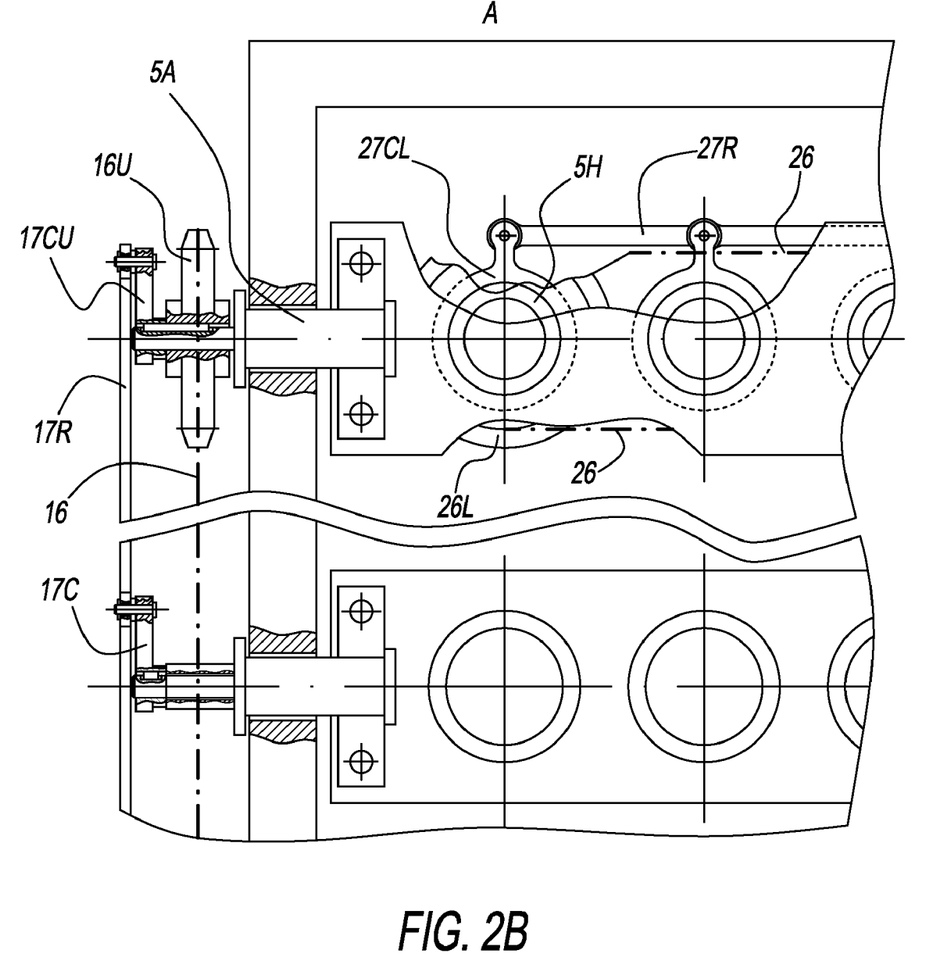
Figure 3:
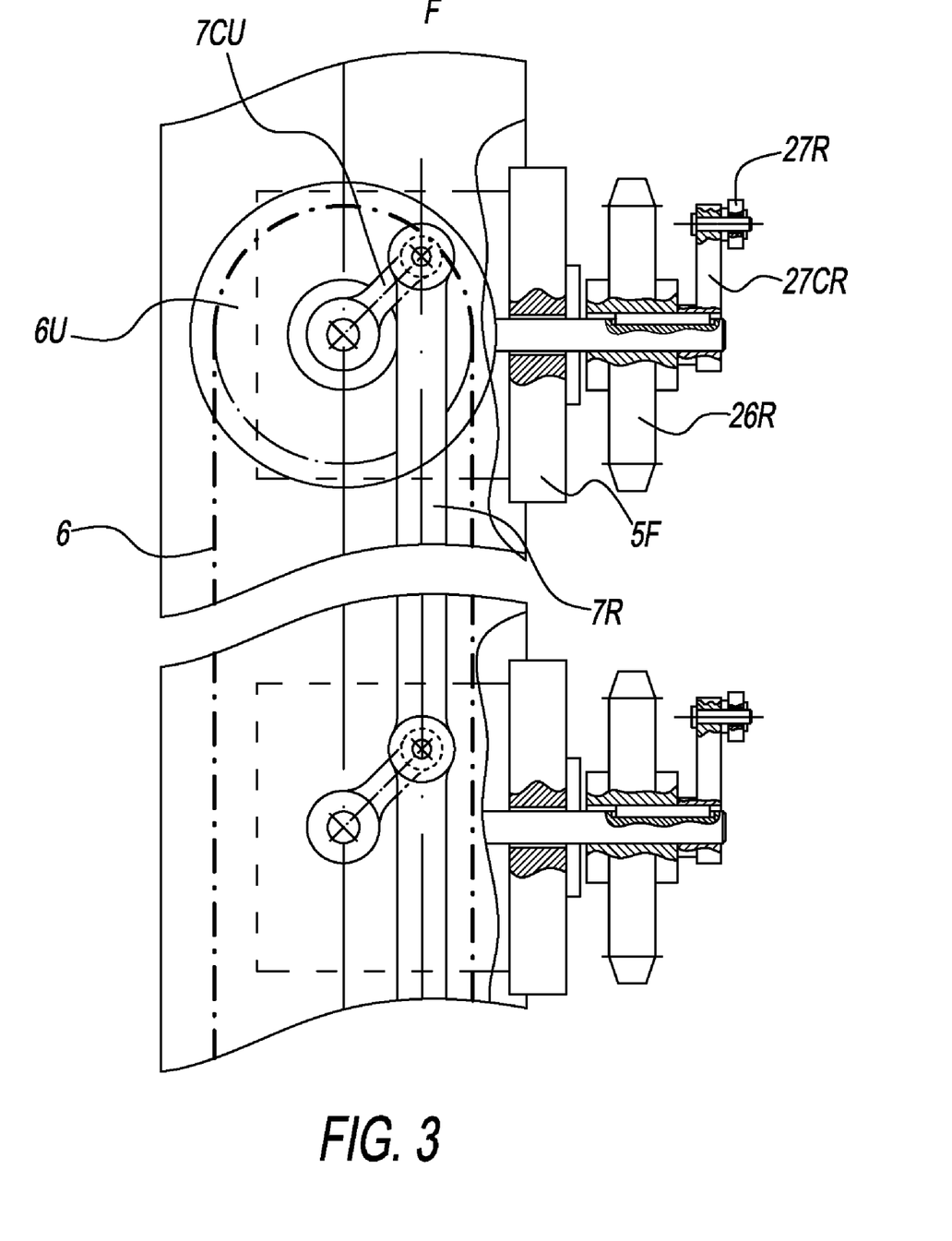
FIG. 3 shows a fragmental sectional view of a main device, within the area defined by circle F in FIG. 1A, (in the 'chain-chain' version) depicting a chain unit and a connecting rod unit for revolving holder frames, according to the preferred embodiment of the present invention shown on FIG. 1.
Figure 4:
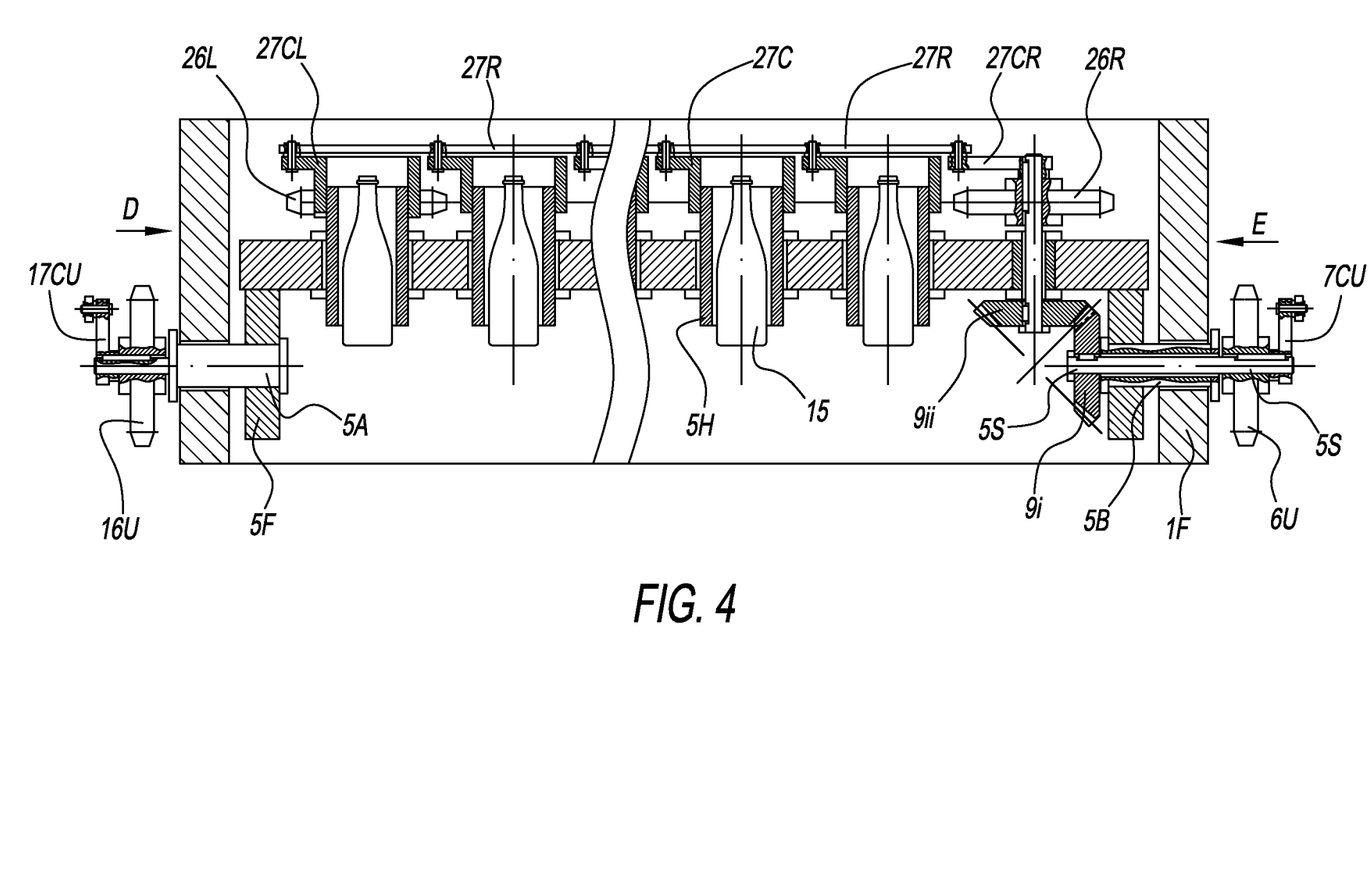
FIG. 4 shows a fragmental sectional view of a main device (in the 'chain-chain' version) depicting a holder frame with bottles, according to the preferred embodiment taken along line 4-4 of the present invention shown on FIG. 1.
Figure 8:
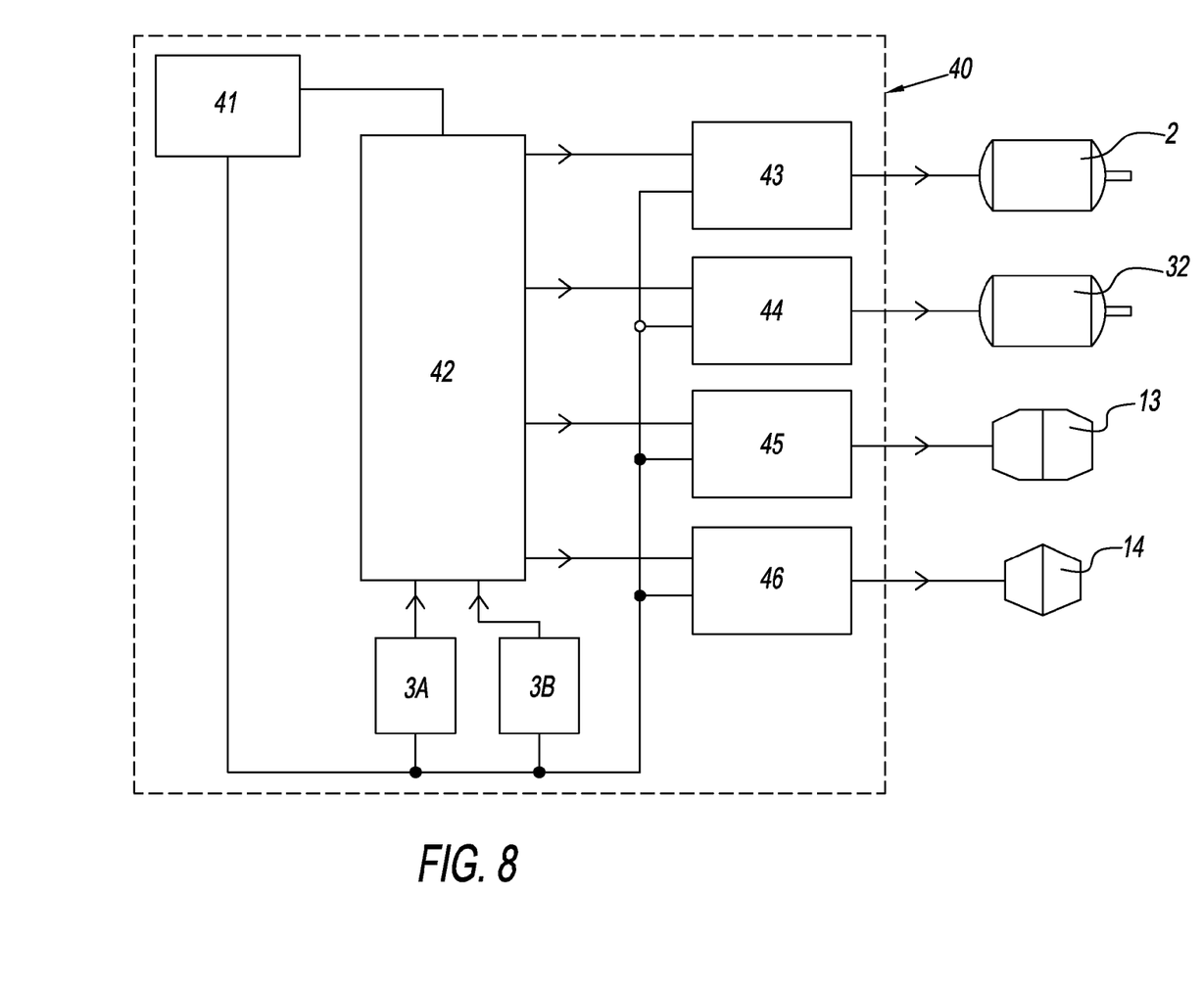
FIG. 8 shows a block-diagram of a control system of the champagne riddling machine, according to a preferred embodiment of the present invention.

The champagne machine in a 'chain-chain' version (illustrated on FIG. 1) comprises at least one main device (10-I) including:

a base (1B), preferably horizontally disposed;

a support frame (1F), preferably vertically disposed, and fixedly mounted on the base 1B;

a main motor (2) preferably mounted on the base 1B, in preferred embodiments it is made as a variable speed type motor;

a common main shaft (4) disposed preferably horizontally, and rotatably mounted with its first end through a conventional bearing to the frame 1F, the shaft 4 is preferably driven by a gear (4G), which is in turn driven by the motor 2; the gear 4G is preferably made as a worm type gear, since this simplifies the control of a rotation angle of the shaft 4, which angle has a relatively small range; in alternative embodiments the gear 4G may be chosen of another type, or the motor 2 can drive the shaft 4 even with no gear (e.g. for a step motor, not illustrated) if the motor 2 is respectively positioned;

a number of pivotal bottle holding racks or frames (5F); the frames 5F are disposed in parallel planes, preferably vertically one above the other; each holding frame 5F is fixed to an axle (5A) (preferably a solid half-axle) that is rotatably mounted through a conventional bearing to the frame 1F e.g. on the left side (D) as shown on FIG. 4 (or alternatively on the right side (E)—not illustrated) and is fixed to a bushing (5B) (a hollow half-axle) that is rotatably mounted through a conventional bearing to the frame 1F e.g. on the right side E as shown on FIG. 4 (or alternatively on the left side D—not illustrated), each bushing 5B encloses an inner shaft (5S) capable to revolve therein; each frame 5F supports a number of individual bottle holders (5H) of a substantially cylindrical shape illustrated on FIG. 4; each holder 5H is capable to revolve within a predetermined ALPHA angle range (preferably 360 degrees) clockwise and counterclockwise around its longitudinal axis; the holders 5H are capable to immovably hold wine bottles (15) (shown on FIG. 4) therein; one holder 5H can hold one bottle 15, whose neck is inclined downwardly as described above; in some embodiments it can hold more than one bottle if needed; the predetermined ALPHA angle range is limited by the described below control system that 'senses' the current angular position, for example of one of the holders 5H, through an angular sensor (3A), depicted on FIG. 8. When the angular position becomes equal to a value determined by the control system, it stops rotation of the holders 5H through regulation of the motor 2 that essentially revolves the corresponding intermediate mechanisms described herein;

a first chain gear (6) (illustrated on FIGS. 1, 1A, 3, 4) for conveying rotation from the main shaft 2 essentially to the holders 5H; the chain gear 6 can be installed, for example, on the right side E of the frame 1F (as shown on FIG. 1), or alternatively on the left side D of the frame 1F (not shown); the chain gear 6 includes a chain linking a lower (driving) pinion (6L) and an upper (driven) pinion (6U), wherein the pinion 6L is fixedly mounted on the common shaft 4, and the pinion 6U is fixedly mounted on the upper shaft 5S that is rotatably enclosed into the bushing 5B;

a first connecting rod unit (7) (illustrated on FIG. 1), including a reciprocating rod (7R), the rod 7R is coupled with the pinion 6U through a crank (7CU) (shown on FIGS. 2a and 3), with the pinion 6L (FIG. 1)through a crank (7CL), and with each shaft 5S, situated below the shaft 5S of the pinion 6U, through a corresponding crank (7C). The cranks 7CU, 7CL, and 7C have a predetermined equal length and are hingedly mounted to the rod 7R with a first end, and to the corresponding shaft 5S with the second end, as shown on FIGS. 1, 2a, 3, and 4;

a number of bevel gears (shown on FIGS. 1 and 2a), whose number is equal to the number of frames 5F, each gear has a driving wheel (9i) fixedly mounted on the shaft 5S of the corresponding frame 5F, and a driven wheel (9ii) rotatably mounted on the corresponding frame 1F, and disposed in the plane perpendicular to the plane of the wheel 9i;

a number of chain gears (26) (FIGS. 1, 4) for revolving the holders 5H about their axes in the predetermined ALPHA angle range, each of the chain gear 26 is installed on the corresponding frame 5F; the chain gear 26 includes a chain linking a beginning (e.g. right-hand) driving pinion (26R) and an ending (e.g. left-hand) driven pinion (26L), wherein the pinion 26R is fixedly coupled to the driven bevel wheel 9ii, and the pinion 26L is coaxially and fixedly coupled to the ending holder 5H on the corresponding frame 5F (FIGS. 1, 2a, 2b and 4);

a number of connecting rod units (FIGS. 1, 3 and 4) each including a reciprocating rod (27R), the rod 27R is coupled with the pinion 26R through a crank (27CR), with the pinion 26L through a crank (27CL), and axially coupled with each holder 5H on the corresponding frame 5F through a corresponding crank (27C). The cranks 27CR, 27CL, and 27C have a predetermined equal length and are hingedly mounted to the rod 27R with a first end, and to the corresponding axle with the second end, as shown on FIGS. 1, 2;

a first strut (11i) and a second strut (11ii) (FIGS. 1, 5), mounted on the base 1B preferably vertically, wherein the first strut 11i supports the second end of the shaft 4 through a conventional bearing, the second strut 11ii supports an intermediate shaft (12) through a conventional bearing; a clutch (13), preferably of an electromagnetic type disposed between the first strut 11i and the second strut 11ii, controllably engaging/disengaging the second end of the shaft 4 and a first end of the shaft 12, a second end of the shaft 12 is coupled with a braking muff (14) preferably of an electromagnetic type, a first member of the muff 14 is coupled to a lower (intermediate) axle (5AL) mounted through a conventional bearing, for example, to the left side D of the frame 1F (as shown on FIGS. 1, 1B), whereas a second member of the muff 14 is coupled immediately to the same side of the frame 1F, so that the muff 14 is capable of controllably engaging/disengaging the lower axle 5AL with the frame 1F thereby capable of braking and stopping rotation of the axle;

a second chain gear (16) (illustrated on FIGS. 1, 1B) for providing a predeterminedly ranged controllable tilt angle BETA, (preferably from 20 to 70 degrees with an increment from 1 to 5 degrees) of the frames 5F about their longitudinal axes. The chain gear 16 can be installed, for example, on the left side D of the frame 1F (as shown on FIG. 1), or alternatively on the right side E of the frame 1F (not shown); the gear 16 includes a chain linking a lower (driving) pinion (16L) and an upper (driven) pinion (16U), wherein the pinion 16L is fixedly mounted on the lower axle 5AL, and the pinion 16U is fixedly mounted on the upper axle 5A through a conventional bearing to the left side D of the frame 1F; the predetermined BETA angle range is limited by a control system that senses the current angular position, for example of one of the frames 5F, through an angular sensor (3B), depicted on FIG. 8, and when the angular position becomes equal to a value determined by the control system, it stops rotation of the frames 5F through regulation of the motor 2 that essentially revolves the corresponding intermediate mechanisms described herein;

a second connecting rod unit (17) (illustrated on FIGS. 1, 1B), including a rod (17R), the rod 17R is coupled with the pinion 16U through a crank (17CU), with the pinion 16L through a crank (17CL), and with each axle 5A, situated below the axle of pinion 16U, through a corresponding crank (17C). The cranks 17CU, 17CL, and 17C have a predetermined equal length and are hingedly mounted to the rod 17R with a first end and mounted to the corresponding axle with the second end, as shown on FIGS. 1, 1B.

Combined Version

Figure 5:
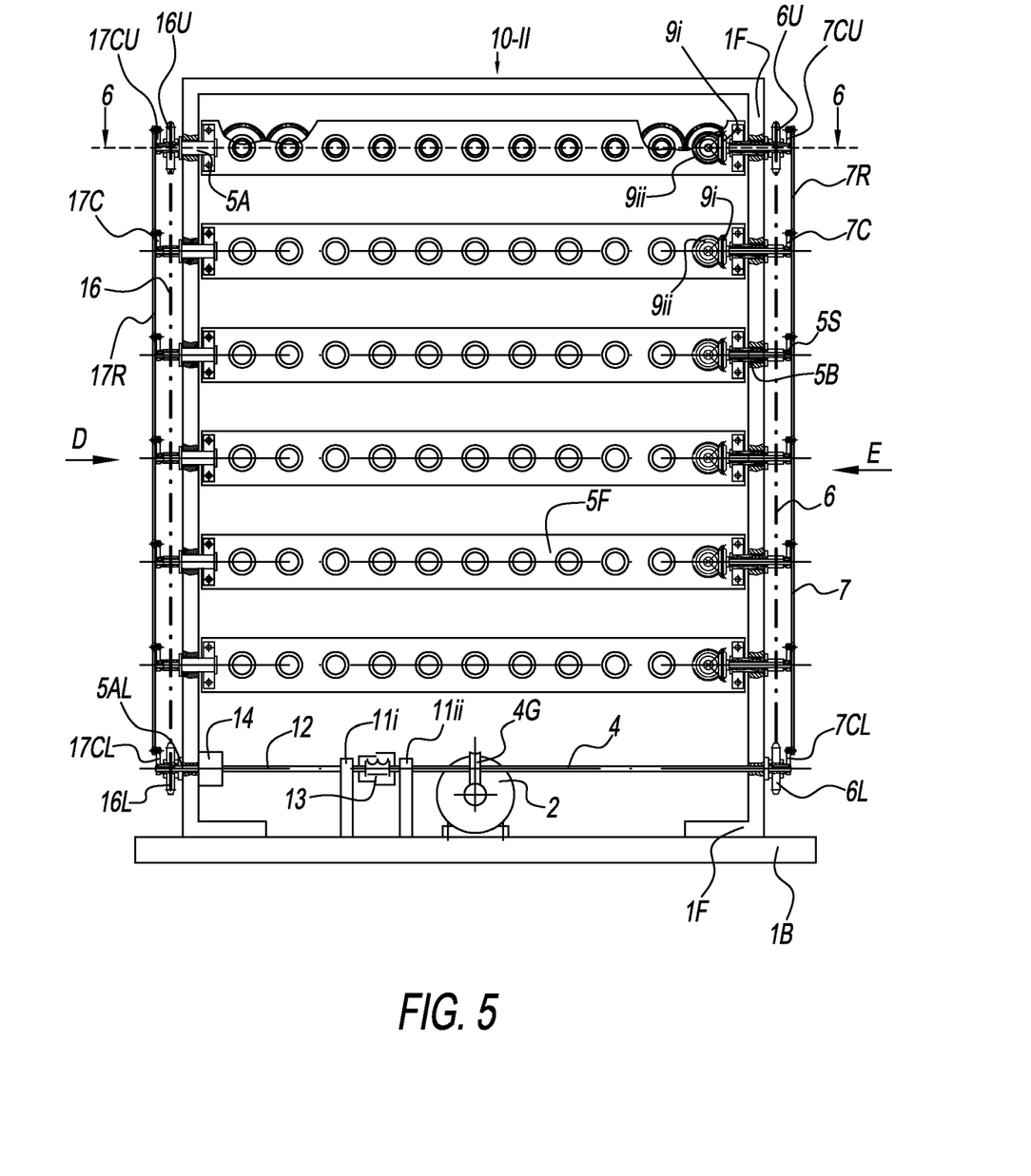
FIG. 5 shows a general front view and a side view of a main device (in the combined version) of the champagne riddling machine, according to another preferred embodiment of the present invention.
Figure 6:
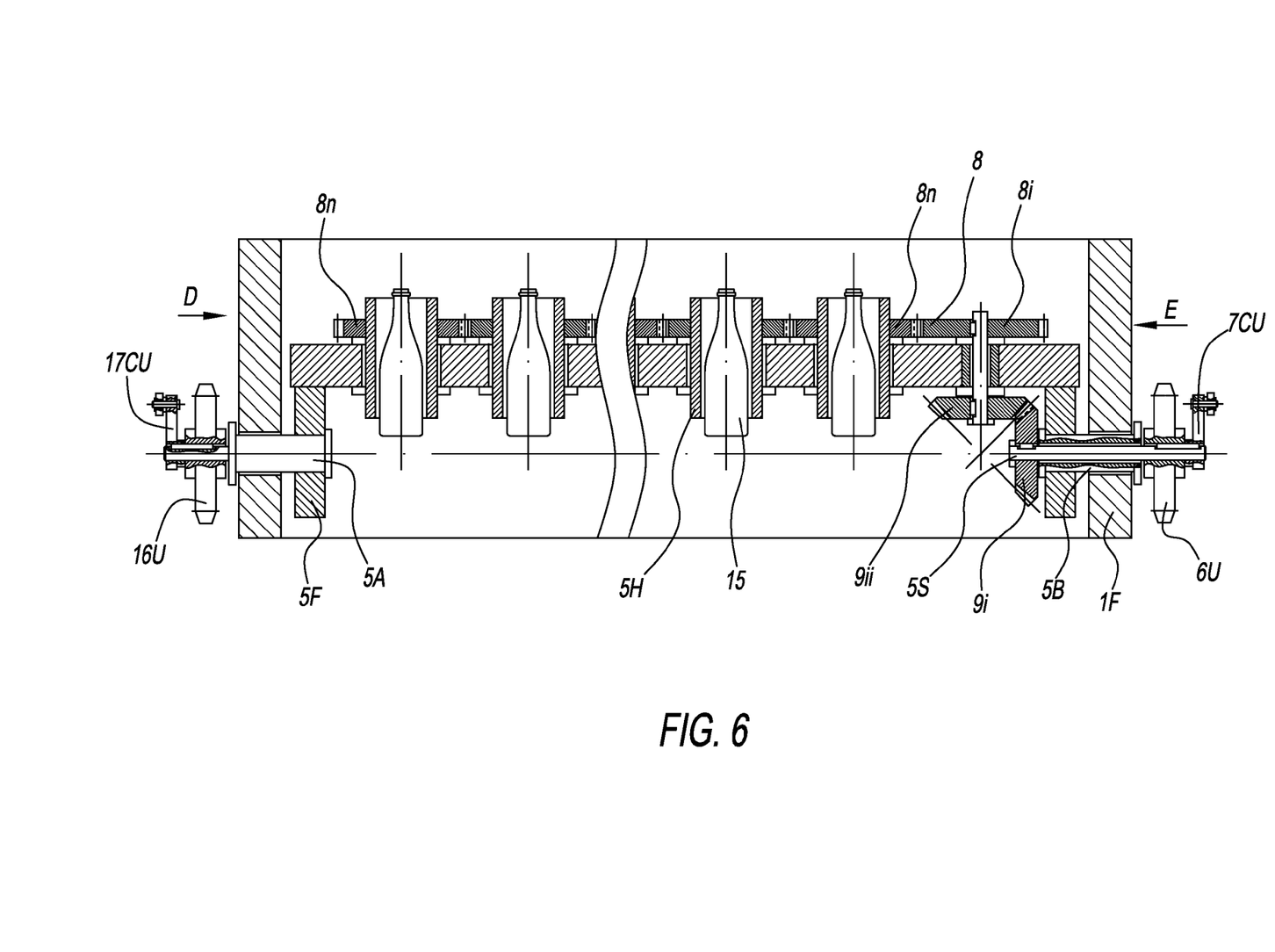
FIG. 6 shows a fragmental sectional view of a main device (in the combined version) depicting a portion of the holder frame with a cogged wheel gear, according to the preferred embodiment taken along line 6-6 of the present invention shown on FIG. 5.

The champagne machine in a combined ('chain-cogged wheels') version comprises at least one main device (10-II) (illustrated on FIGS. 5 and 6) including:

a base 1B, preferably horizontally disposed;

a support frame 1F, preferably vertically disposed, and fixedly mounted on the base 1B;

a main motor 2 preferably mounted on the base 1B, in preferred embodiments it is made as a variable speed type motor;

a common main shaft 4 disposed preferably horizontally, and rotatably mounted with its first end through a conventional bearing to the frame 1F, the shaft 4 is preferably driven by a gear 4G (FIG. 5), which is in turn driven by the motor 2; the gear 4G is preferably made as a worm type gear, since this simplifies the control of a rotation angle of the shaft 4, which angle has a relatively small range; in alternative embodiments the gear 4G may be chosen of another type, or the motor 2 can drive the shaft 4 even with no gear (e.g. for a step motor, not illustrated) if the motor 2 is respectively positioned;

a number of pivotal bottle holding racks or frames 5F; the frames 5F are disposed in parallel planes, preferably vertically one above the other; each holding frame 5F is fixed to an axle 5A (preferably a solid half-axle) that is rotatably mounted through a conventional bearing to the frame 1F e.g. on the left side D as shown on FIG. 4 (or alternatively on the right side E—not illustrated) and is fixed to a bushing 5B (a hollow half-axle) that is rotatably mounted through a conventional bearing to the frame 1F e.g. on the right side E as shown on FIG. 4 (or alternatively on the left side D—not illustrated), each bushing 5B encloses an inner shaft 5S capable to revolve therein; each frame 5F supports a number of individual bottle holders 5H of a substantially cylindrical shape illustrated on FIG. 4; each holder 5H is capable to revolve within a predetermined ALPHA angle range (preferably 360 degrees) clockwise and counterclockwise around its longitudinal axis; the holders 5H are capable to immovably hold wine bottles 15 (shown on FIG. 4) therein; one holder 5H can hold one bottle 15, whose neck is inclined downwardly as described above; in some embodiments it can hold more than one bottle if needed; the predetermined ALPHA angle range is limited by the described below control system that 'senses' the current angular position, for example of one of the holders 5H, through an angular sensor 3A, depicted on FIG. 8. When the angular position becomes equal to a value determined by the control system, it stops rotation of the holders 5H through regulation of the motor 2 that essentially revolves the corresponding intermediate mechanisms described herein;

a first chain gear 6 (illustrated on FIG. 5) for conveying rotation from the main shaft 4 essentially to the holders 5H; the chain gear 6 can be installed, for example, on the right side E of the frame 1F (as shown on FIG. 1), or alternatively on the left side D of the frame 1F (not shown); the chain gear 6 includes a chain linking a lower (driving) pinion 6L and an upper (driven) pinion 6U, wherein the pinion 6L is fixedly mounted on the common shaft 4, and the pinion 6U is fixedly mounted on the upper shaft 5S that is rotatably enclosed into the bushing 5B;

a first connecting rod unit 7 (illustrated on FIG. 5), including a reciprocating rod 7R, the rod 7R is coupled with the pinion 6U through a crank 7CU, with the pinion 6L through a crank 7CL, and with each shaft 5S, situated below the shaft 5S of the pinion 6U, through a corresponding crank 7C. The cranks 7CU, 7CL, and 7C have a predetermined equal length and are hingedly mounted to the rod 7R with a first end, and to the corresponding shaft 5S with the second end, as shown on FIGS. 1, 2a, 3, 4, 5;

a number of bevel gears (shown on FIGS. 1 and 2), whose number is equal to the number of frames 5F, each gear has a driving wheel 9i fixedly mounted on the shaft 5S of the corresponding frame 5F, and a driven wheel 9ii rotatably mounted on the corresponding frame 1F, and disposed in the plane perpendicular to the plane of the wheel 9i;

a cogged gear (8) (FIG. 6) including a driving cogged wheel (8i), coaxially coupled with the driven bevel wheel 9ii, capable of revolving a number of driven cogged wheels (8n) sequentially conveying the rotation along the row, each wheel 8n is coaxially coupled to the corresponding holder 5H supporting the bottle 15;

a first strut 11i and a second strut 11ii, mounted on the base 1B preferably vertically, wherein the first strut 11i supports the second end of the shaft 4 through a conventional bearing, the second strut 11ii supports an intermediate shaft 12 through a conventional bearing; a clutch 13, preferably of an electro-magnetic type disposed between the first strut 11i and the second strut 11ii, controllably engaging/disengaging the second end of the shaft 4 and a first end of the shaft 12, a second end of the shaft 12 is coupled with a braking muff 14 preferably of an electro-magnetic type, a first member of the muff 14 is coupled to a lower (intermediate) axle 5AL mounted through a conventional bearing, for example, to the left side D of the frame 1F (as shown on FIG. 5), whereas a second member of the muff 14 is coupled immediately to the same side of the frame 1F, so that the muff 14 is capable of controllably engaging/disengaging the lower axle 5AL with the frame 1F and is thereby capable of braking and stopping rotation of the axle;

a second chain gear 16 for providing a predeterminedly ranged controllable tilt angle BETA, (preferably from 20 to 70 degrees with an increment from 1 to 5 degrees) of the frames 5F about their longitudinal axes. The chain gear 16 can be installed, for example, on the left side D of the frame 1F (as shown on FIG. 5), or alternatively on the first (e.g. right) side of the frame 1F (not shown); the gear 16 includes a chain linking a lower (driving) pinion 16L and an upper (driven) pinion 16U, wherein the pinion 16L is fixedly mounted on the lower axle 5AL, and the pinion 16U is fixedly mounted on the upper axle 5A through a conventional bearing to the second (e.g. left) side of the frame 1F; the predetermined BETA angle range is limited by a control system that senses the current angular position, for example of one of the frames 5F, through an angular sensor 3B, depicted on FIG. 8, and when the angular position becomes equal to a value determined by the control system, it stops rotation of the frames 5F through regulation of the motor 2 that essentially revolves the corresponding intermediate mechanisms described herein.

a second connecting rod unit 17, including a rod 17R, the rod 17R is coupled with the pinion 16U through a crank 17CU, with the pinion 16L through a crank 17CL, and with each axle 5A, situated below the axle of pinion 16U, through a corresponding crank 17C. The cranks 17CU, 17CL, and 17C have a predetermined equal length and are hingedly mounted to the rod 17R with a first end, and mounted to the corresponding axle with the second end, as shown on FIG. 5.

Vibration Equipment

Figure 7:
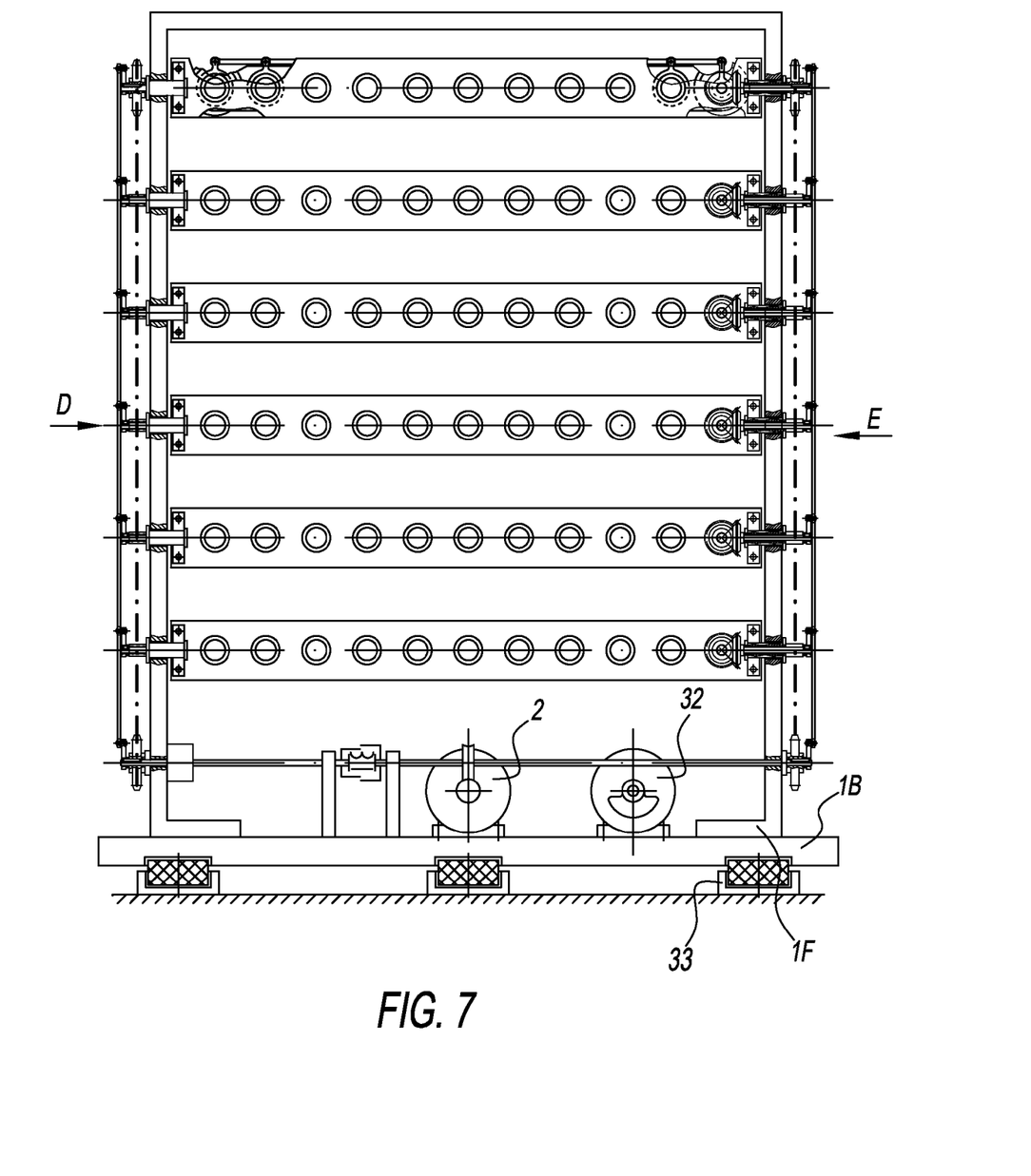
FIG. 7 shows a general front view of the champagne riddling machine comprising a main device associated with a vibration unit, according to a preferred embodiment of the present invention.

In preferred embodiments, the champagne machine also comprises:

a plurality of vibro-pads (33) (shown on FIG. 7), each vibro-pad 33 preferably including a spring mechanism and a shock-absorbing (or vibration absorbing) foot; the vibro-pads 33 support the base 1B;

a vibro-motor (32), (depicted on FIG. 7 and FIG. 8), in preferred embodiments made as a variable speed type motor, having an eccentric (not shown) of a predetermined shape and weight, mounted on its shaft, the vibro-motor 32 is mounted upon the base 1B; in alternative embodiments another vibration causing means can be coupled with the vibro-motor 32, and the vibro-motor 32 can be mounted separate from the base and coupled with the base through a suitable known mechanism;

a controller (44) (illustrated on FIG. 8) for regulating the speed of the vibro-motor 32.

Control System

The champagne machine comprises a control system (40), which is shown on FIG. 8. The control system 40 can be utilized for both the 'chain-chain' and the combined versions of the main device. In preferred embodiments, the control system 40 includes at least:

a conventional power source (41), shown on FIG. 8, the source 41 powers at least the other units of the control system;

a main control board (42) for operation of the champagne machine, the board 42 is preferably assembled from conventional electronic circuits, micro-processors, memory chips, timers, programmable logic controllers, indicators, and other known suitable means; the board 42 is illustrated on FIG. 8, it operates based on a corresponding computer program incorporating at least the above mentioned requirements of technological process for making champagne, and is used for control of the champagne machine that comprises only one main device 10-I or 10-II, but in general it can be routinely built for control of a champagne machine comprising a necessary number of the inventive main devices (not illustrated);

a variable frequency drive (43), shown on FIG. 8. It is used to vary and adjust the speed of the motor 2, to start and stop it when necessary; the variable frequency drive 43 is controlled by the board 42, according to the aforementioned computer program;

the aforesaid vibration controller 44 for regulating the operation of the vibro-motor 32, the controller 44 is controlled by the board 42, according to the aforementioned computer program;

the aforesaid angular sensor 3A, shown on FIG. 8, for sensing the current ALPHA angle position and providing feed-back to the board 42 that makes the decision on stopping the motor 2 when necessary and/or limiting the range of rotation of the holders 5H, the sensor 3A is mounted in a suitable place of the main device;

the aforesaid angular sensor 3B, shown on FIG. 8, for sensing the current BETA angle position and providing feed-back to the board 42 that makes the decision on stopping the motor 2 when necessary and limiting the range of rotation of the frames 5F, the sensor 3B is mounted in a suitable place of the main device;

a controller (45), shown on FIG. 8, for regulating the state of the clutch 13 (switching the clutch into on/off positions), the controller 45 is controlled by the board 42, according to the aforementioned computer program;

a controller (46), shown on FIG. 8, for regulating the state of the braking muff 14 (switching the muff into on/off positions), the controller 46 is controlled by the board 42, according to the aforementioned computer program.

Examples of Operation of a Preferred Embodiment

Examples of operation of the champagne machine comprising only one main device 10-I (illustrated on FIG. 1) follow:

A) ALPHA Angle Changing Mode

According to instructions of the aforementioned computer program, the board 42 issues a command to the controller 45 to switch the clutch 13 into the 'off' position (i.e. disengage it), a command to the controller 46 to switch the muff 14 into the 'on' position (i.e. engage it, this holds the frames 5F essentially at a constant BETA angle preventing their revolving caused e.g. by gravitation), and a command to the controller 43 to provide a necessary rotational angle of the motor 2 with a necessary increment. The motor 2 drives the gear 4G conveying rotation to the shaft 4 driving the pinion 6L, the corresponding chain of the unit 6, and the pinion 6U, impelling the rod 7R, which in turn revolves the cranks 7CL, 7CU, and 7C that further rotate the corresponding shafts 5S, the wheels 9i and 9ii, the pinions 26R axially fixed to the corresponding wheels 9ii, and associated via the corresponding chain with the corresponding pinions 26L, impelling the corresponding rods 27R, which in turn revolve the corresponding cranks 27CL, 27CR, and 27C that further rotate the respective holders 5H on the corresponding frames 5F (FIGS. 1, 4). The rotation lasts until the ALPHA angular position, determined by the sensor 3A (FIG. 8) and further fed into the board 42, becomes equal to a program-generated value of the ALPHA angle conditioned by the champagne making technology, whereat the board 42 issues a command to stop the rotation of the holders 5H through the controller 43 regulating the motor 2 that essentially revolves the aforesaid intermediate mechanisms, and, if necessary, a command to re-engage the clutch 13, and engage the muff 14.

B) BETA Angle Changing Mode

According to instructions of the aforementioned computer program, the board 42 issues a command to the controller 45 to switch the clutch 13 into the 'on' position (i.e. engage it), a command to the controller 46 to switch the muff 14 into the 'off' position (i.e. disengage it), and a command to the controller 43 to provide a necessary rotational angle of the motor 2. The motor 2 via the gear 4G revolves the shaft 4, which shaft 4 through the clutch 13 drives the shaft 12, and via the released muff 14 (that does not brake when being disengaged) revolves the axle 5AL, rotating the pinion 16L, the chain of gear 16, the pinion 16U, impelling the rod 17R, which in turn revolves the cranks 17CU, 17CL, and 17C that further the respective axles 5A of the corresponding frames 5F causing their rotation. At the same time, the motor 2 drives the gear 4G conveying rotation to the shaft 4 driving the pinion 6L, the chain of the unit 6, and the pinion 6U, impelling the rod 7R, which in turn revolves the cranks 7CL, 7CU, and 7C that further rotate the corresponding shafts 5S, the corresponding wheels 9i and 9ii, the corresponding pinions 26R axially fixed to the wheels 9ii and associated via the corresponding chain with the pinions 26L, impelling the rods 27R, which in turn revolve the cranks 27CL, 27CR, and 27C that further rotate the respective holders 5H on the corresponding frames 5F (FIGS. 1, 4). This counter-rotation of the holders 5H compensates an undesirable rotation of the holders 5H through the bevel gears, so that the ALPHA angular position of the holders 5F essentially does not change. The rotation of the frames 5F lasts until the BETA angular position, determined by the sensor 3B (FIG. 8) and further fed into the board 42, becomes equal to a program-generated value of the BETA angle conditioned by the champagne making technology, whereat the board 42 issues a command to stop the rotation of the frames 5F through the controller 43 regulating the motor 2 that essentially revolves the aforesaid intermediate mechanisms.

C) Control of Vibrations

According to the aforesaid computer program conditioned by the champagne making technology, the board 42 issues a command to the controller 44 to switch 'on' the vibro-motor 32, which actuates vibrations of the base 1B, and the program further regulates the periods and intenseness of the vibrations through varying the speed of the vibro-motor 32.

The operation of the champagne machine comprising one main device 10-II or several main devices 10-I and/or 10-II does not significantly differ from the above example, since their mechanisms and control units perform substantially the same functions.

Parameters of the Preferred Embodiments

In preferred embodiments, the inventive champagne riddling machine is characterized with the following mechanical and electrical parameters:

a) Main device capacity: 120-200 bottles;
b) Approximate overall dimensions: 6 feet (183 cm).times.10 feet (305 cm).times.40 inches (100 cm);
c) Automatic powered bottle tilt range: between 20 and 70 degrees from the horizontal plane with an angular increment from 1 to 5 degrees;
d) Programmable automatic powered bottle rotation;
e) Programmable vibration frequency electronically variable from 1800 to 3600 RPM;
f) Adjustable vibrations from 0.001" to 0.012";
g) Power requirements: 230/460 V of AC, 3 phases, 60 Hz;
h) The controllers have options to be connected to the main device via wires or a wireless network;
i) The control system is capable to operate up to 200 main devices simultaneously in the asynchronous mode.

Optional Embodiments of the Invention

In an optional embodiment (not illustrated), the first chain gear 6 and the first connecting rod unit 7 can be substituted with a driving cogged wheel (similar to the above-described wheel 8i), coaxially coupled with the shaft 4, sequentially conveying the rotation along a vertical row of driven cogged wheels (similar to the above-described horizontal row of wheels 8n), each such driven wheel is coaxially coupled to the corresponding shaft 5S.

In another optional embodiment (not illustrated), the second chain gear 16 and the second connecting rod unit 17 can be substituted with a driving cogged wheel (similar to the above-described wheel 8i), coaxially coupled with the axle 5AL, sequentially conveying the rotation along a vertical row of driven cogged wheels (similar to the above-described horizontal row of wheels 8n), each such driven wheel is coaxially coupled to the corresponding axle 5A.

In yet another optional embodiment (not illustrated), both combinations:
a) the first vertical chain gear 6 and the first connecting rod unit 7, and
b) the second vertical chain gear 16 and the second connecting rod unit 17, can be substituted with corresponding vertical cogged wheel gears (similar to the above-described horizontal row of wheels 8n).

Some other optional embodiments (not illustrated) may include a rack gear utilized instead of the above combination (a), or (b), or (a) AND (b), wherein the rack is driven by a lower pinion driven by the main shaft 4 or the intermediate axle 5AL, and in turn, the rack drives a number of frame pinions (mounted on each frame 5F), wherein each frame pinion rotates the corresponding inner shaft 5S, or/and the corresponding axle 5A. Such rack gears can also be used instead of the above-described horizontal row of wheels 8n.

Yet other optional embodiments (not illustrated) may include a worm gear utilized instead of the above combination (a), or (b), or (a) AND (b), wherein the worm shaft is driven by a lower pinion driven by the main shaft 4 or the intermediate axle 5AL, and in turn, the worm shaft drives a number of frame pinions (mounted on each frame 5F), wherein each frame pinion rotates the corresponding inner shaft 5S, or/and the corresponding axle 5A. Such worm gears can also be used instead of the above-described horizontal row of wheels 8n.

The aforementioned optional embodiments operate similarly to the one discussed above. Any combination of the above discussed types of gear, and also other known types (such as a belt gear, etc.) can substitute the above combination (a), or (b), or (a) AND (b), if routinely designed and might perform the aforesaid functions.

I claim:

1. A device for providing a riddling stage in the process of making sparkling wine comprising:
    a base means;
    a support means mounted upon the base means;
    a main motor;
    a main shaft substantially mounted to said support means and substantially driven by said main motor;
    a number of pivotal frames disposed in parallel planes;
        each said frame is fixed to a first half-axle and a second hollow half-axle both revolvably mounted to said support means;
        each said frame is furnished with an inner shaft rotatably enclosed into said second half-axle;
        each said frame is furnished with a bevel gear including a bevel driving wheel fixedly coupled on said inner shaft, and a bevel driven wheel rotatably mounted on the corresponding said frame and driven by said bevel driving wheel;
        each said frame is furnished with a number of bottle holders rotatably mounted on the frame and capable to controllably revolve within a predetermined ALPHA angle range;
        each said frame is furnished with means for revolving the holders substantially driven by said bevel driven wheel;
    first gear means for conveying rotation from said main shaft to said inner shafts, said first gear means are predeterminedly mounted to said support means;
    an intermediate shaft with its first end controllably engaged/disengaged to said main shaft, and with its second end connected through a braking muff to an intermediate axle rotatably mounted to said support means, said muff is capable to controllably brake rotation of said intermediate axle; and
    second gear means for providing a predeterminedly ranged controllable tilt angle BETA of said frames about their longitudinal axes, said second gear means are predeterminedly mounted to said support means and controllably driven by said main motor substantially via said intermediate axle, said second gear means convey rotation to said first half-axles of the corresponding frames.

2. The device according to claim 1, wherein said main shaft is driven by a worm type gear driven by said main motor.

3. The device according to claim 1, wherein said ALPHA angle range is from 0 to 360 degrees, and said BETA angle range is from 20 to 70 degrees.

4. The device according to claim 1, further comprising a plurality of vibro-pads supporting said base means; and a means for vibrating said base means.

5. A sparkling wine riddling machine including at least one device according to claim 4 and means for control thereof.

* * * * *